(12) United States Patent  (10) Patent No.: US 7,393,012 B2
Funakura et al.  (45) Date of Patent: *Jul. 1, 2008

(54) KNEE BOLSTER STRUCTURE

(75) Inventors: Kazuki Funakura, Tokyo (JP); Nobuhiro Nagata, Tokyo (JP); Tsutomu Kawashima, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 490 days.

This patent is subject to a terminal disclaimer.

(21) Appl. No.: 10/991,541

(22) Filed: Nov. 19, 2004

(65) Prior Publication Data

US 2005/0110250 A1  May 26, 2005

(30) Foreign Application Priority Data

| Nov. 21, 2003 | (JP) | ............................ 2003-392004 |
| Feb. 4, 2004 | (JP) | ............................ 2004-028172 |
| Feb. 4, 2004 | (JP) | ............................ 2004-028173 |
| Mar. 4, 2004 | (JP) | ............................ 2004-060577 |

(51) Int. Cl.
*B60R 21/02* (2006.01)
(52) U.S. Cl. ........................ 280/748; 280/752
(58) Field of Classification Search ................ 280/752, 280/753, 730.1, 748; 180/90
See application file for complete search history.

(56) References Cited

U.S. PATENT DOCUMENTS

| 5,344,184 | A | * | 9/1994 | Keeler et al. ............. 280/730.1 |
| 5,374,105 | A | * | 12/1994 | Kracht et al. ............ 297/216.1 |
| 6,752,423 | B2 | * | 6/2004 | Borde et al. ................ 280/753 |
| 7,185,917 | B2 | * | 3/2007 | Nagata et al. ............... 280/748 |

FOREIGN PATENT DOCUMENTS

| JP | 6-032195 A | 2/1994 |
| JP | 8-282413 A | 10/1996 |

* cited by examiner

*Primary Examiner*—Faye M. Fleming
(74) *Attorney, Agent, or Firm*—Foley & Lardner LLP

(57) ABSTRACT

A knee bolster structure includes a vehicle-side member, a knee-receiving member, an impact-absorbing section for absorbing an input energy from knees of a driver or front-seat passenger when the knees hit the knee-receiving section, and a knee-receiving member movement section for moving the knee-receiving member to a knee-receiving position for the driver or front-seat passenger, said knee-receiving member being attached to the vehicle-side member via the impact-absorbing section and the knee-receiving member movement section, the impact-absorbing section being structurally separated from the knee-receiving member movement section.

17 Claims, 13 Drawing Sheets

KNEE BOLSTER STRUCTURE

BACKGROUND OF THE INVENTION (1) Field of the Invention

The present invention relates to knee bolster structures to be attached to vehicles such as automobiles.

(2) Related Art Statement

Investigations have been made to install knee bolster structures (which may be also called "knee protectors") in interiors of vehicles such as automobiles so as to protect knees of drivers and passengers at front seats upon applications of loads, and their development has been carried out (See JP-A 6-32195 and JP-A 8-282413, for example).

It is the present situation that such knee bolster structures have been developed, designed and attached independently for respective kinds of automobiles, which have required much developing time and costs.

The knee bolster structure needs to be certainly operated or its operation certainty needs to be enhanced to as high a level as possible.

From this point of view, a knee-receiving member of the knee bolster structure projects and protect knees upon application of a load at the time of collision or the like. However, the applicants noticed that impact force which acts upon an operating shaft when the knee-receiving member projects is not small, so that there may be room for improvement to certainly ensure the operation.

Furthermore, it was also noticed that when the knees are protected with the projecting knee-receiving member at the time of application of the load in collision or the like, the knee-receiving member may be pushed back with input force from the knees. The applicants noticed that the effect of accurately protecting the input from the knees upon the knee-receiving member might be reduced.

The knee bolster structure needs to have a knee-receiving member for receiving input from knees of a driver or front-seat or passenger and an impact-absorbing section for absorbing input energy from the knees when they hit the knee-receiving member. Further, consideration has been made to use a knee-receiving member movement section which moves the knee-receiving member to a knee-receiving position for the driver or front-seat passenger so that the knee bolster structure may cope with any person depending upon its physique. However, even if the knee-receiving member movement section is provided, a given impact-absorbing performance cannot be exhibited if the function of moving the knee-receiving member is collapsed with the input load before the impact-absorbing function. Therefore, the function of moving the knee-receiving member needs to be tougher than the impact-absorbing function.

SUMMARY OF THE INVENTION

In order to solve the above problems, the present invention provides a knee bolster structure comprising a vehicle-side member, a knee-receiving member, an impact-absorbing section for absorbing an input energy from knees of a driver or front-seat passenger when the knees hit the knee-receiving section, and a knee-receiving member movement section for moving the knee-receiving member to a knee-receiving position for the driver or front-seat passenger, said knee-receiving member being attached to the vehicle-side member via the impact-absorbing section and the knee-receiving member movement section, the impact-absorbing section being structurally separated from the knee-receiving member movement section.

According to the present invention, the impact-absorbing section and the knee-receiving member movement section are structurally divided or separated to afford different functions thereto, respectively and can be combined together, so that when plural kinds of impact-receiving sections and knee-receiving member movement section are preliminarily prepared, appropriate combinations can be selected among them to cope with many types of cars. With respect to plural cars which have similar shapes and qualities around instrument panels, a common section can be used for either one of the impact-absorbing section and the knee-receiving member movement section, while simply modified parts having slightly changed dimensions, etc. are prepared and used for the other. Thus, the costs and developing time period can be reduced by the measure that the impact-absorbing section and the knee-receiving member movement section are structurally divided from each other as separate sections and combined together.

In the following, preferred embodiments of the present invention will be recited. Any combinations of them are preferred embodiments of the present invention, unless they are contrary to the invention.

(1) The knee-receiving member movement section comprises a fixed arm and a movable arm which are connected together with a hinge at upper end portions thereof such that the movable arm may be freely opened from the fixed arm via the hinge, and an operating lever for opening the movable arm relative to the fixed arm, wherein the operating lever connected to the movable arm via slide fitting between an elongate hole and an operating shaft for them.

(2) An impact-mitigating means is provided to mitigate an impact force generated at the operating shaft. When the impact-mitigating means mitigates impact force generated at the operating shaft, a portion including the operating shaft can be prevented to enhance certainty of the operation. Alternatively, the diameter of the operating shaft can be decreased to increase the latitude in designing. The certainty of the operation can be realized by providing the impact-mitigating means to mitigate the impact force generated at the operating shaft.

(3) The impact-mitigating means is a stopper, provided at the fixed arm, upon which the operation lever hits before the operating shaft reaches an open-side end of the elongate hole. In this embodiment, since the operating lever hits the stopper provided at the fixed arm before the operating shaft reaches the open-side end of the elongate hole, the impact force acting upon the operating shaft can be mitigated.

(4) The impact-mitigating means is a decelerating portion provided at an open-side end of the elongate hole to reduce the speed of the operating shaft. In this embodiment, since the speed of the operating shaft is reduced by the decelerating portion provided at the elongate hole, the impact force acting upon the operating shaft can be decreased.

(5) The impact-mitigating mechanism comprises an impact-absorbing plate deformably provided at the movable arm and a cord-like member connecting the impact-absorbing plate with the fixed arm so that the cord-like member may generate tension between the impact-absorbing plate and the fixed arm as the movable arm opens from the fixed arm. When the movable arm opens from the fixed arm around the hinge as a center, the impact-absorbing plate is deformed by tension generated at the cord-like member connecting the fixed arm with the impact-absorbing plate. Consequently, the movable arm is decelerated, and impact force acting upon the operating shaft can be reduced. In this way, the impact-mitigating mechanism mitigates the impact force generated at the operating shaft, so that the certainty of the operation can be enhanced by preventing the breakage of the portion surrounding or including the operating shaft. Alternatively, the diameter of the operating shaft can be decreased to enhance the latitude in designing. The certainty of the operation can be enhanced as the impact-absorbing plate attached to the movable arm is deformed with the cord-like member.

(6) A holding mechanism is further provided to maintain the movable arm relative to the fixed arm in an opened state.

(7) The movable arm has a sectional shape so slightly larger than that of the fixed arm that the movable arm may fit around an outer periphery of the fixed arm, and the holding mechanism is provided at the movable arm. Since the movable arm has the shape so slightly larger than that of the fixed arm that the movable arm may fit around the outer periphery of the fixed arm, the strength of the movable arm to which the knee-receiving member is directly attached can be increased. Therefore, the strength of the entire knee-receiving member movement section can be easily ensured.

The strength of the knee-receiving member movement function can be assured by the construction that the knee-receiving member movement section comprises the fixed arm and the movable arm, which are connected to each other via the hinge at their upper end portions in such a manner that the movable arm may be opened relative to the fixed arm, the actuating mechanism for opening the movable arm relative to the fixed arm as well as the holding mechanism for holding the movable arm in the opened state, that the movable arm has the sectional shape so slightly larger than that of the fixed arm that the former may be fitted around the outer periphery of the latter, and that the holding mechanism is provided at the movable arm.

(8) The impact-absorbing section is vertically divided into two sections: an upper impact-receiving portion capable of absorbing input energy from knees of a front-seat person having the average physique or a relatively large physique and a lower impact-receiving portion capable of absorbing input energy from knees of a front-seat person having a relatively small physique.

(9) By selecting any one of the following (a) to (e) or combining any of (a) to (e) in any fashion, strength is made different between the upper impact-absorbing portion and the lower impact-absorbing portion by increasing the strength of the upper impact-absorbing section and decreasing the lower impact-receiving portion.

In this discussion, the strength of the lower impact-absorbing portion moans that of a portion of the lower impact-absorbing portion which neither the upper impact-absorbing portion 11 nor the knee-receiving member movement section 7 are attached.

(a) To relatively shorten the whole dimension of the upper impact-absorbing portion and relatively prolong that of the lower impact-absorbing portion.

(b) To make the length of the upper impact-absorbing portion different from that of the lower impact-absorbing portion.

(c) To make the thickness of the upper impact-absorbing portion larger than that of the lower impact-absorbing portion.

(d) To make the sectional shape of the upper impact-absorbing portion larger than that of the lower impact-absorbing portion.

(e) To provide a bendable portion or bendable portions for each of the upper impact-absorbing portion and the lower impact-absorbing portion, and to make the numbers of the bendable portions different between the upper and lower impact-absorbing portions.

(10) The knee-receiving member movement section further comprises an explosion type cylinder-based actuator.

A second aspect of the invention also provides a knee bolster structure comprising a vehicle-side member, a knee-receiving member, an impact-absorbing section for absorbing an input energy from knees of a driver or front-seat passenger when the knees hit the knee-receiving section, and a knee-receiving member movement section for moving the knee-receiving member to a knee-receiving position for the driver or front-seat passenger, said knee-receiving member being attached to the vehicle-side member via the impact-absorbing section and the knee-receiving member movement section, wherein the knee-receiving member movement section comprises a fixed arm and a movable arm which are connected together with a hinge at upper end portions thereof such that the movable arm may be opened from the fixed arm via the hinge, and an operating mechanism for opening the movable arm relative to the fixed arm, the movable arm has a sectional shape so slightly larger than that of the fixed arm that the former may be externally fitted around the latter, and the fixed arm has a holding mechanism provided at the movable arm.

A third aspect of the present invention also provides a knee bolster structure comprising a vehicle-side member, a knee-receiving member, an impact-absorbing section for absorbing an input energy from knees of a driver or front-seat passenger when the knees hit the knee-receiving section, and a knee-receiving member movement section for moving the knee-receiving member to a knee-receiving position for the driver or front-seat passenger, said knee-receiving member being attached to the vehicle-side member via the impact-absorbing section and the knee-receiving member movement section, wherein the knee-receiving member movement section comprises a fixed arm and a movable arm which are connected together with a hinge at upper end portions thereof such that the movable arms may be opened from the fixed arm via the hinge, and an operating lever for opening the movable arm relative to the fixed arm, the operating lever being connected to the movable arm via slide fitting between an elongate hole and an operating shaft for them, and the knee bolster structure further comprises an impact-mitigating mechanism for mitigating an impact force generating in the operating shaft.

The above-mentioned preferred embodiments of the first aspect of the present invention are preferred ones for the second and third aspects of the invention, unless they are contrary to the second and third ones. Among them, the following are recited to be particularly preferred.

(1) The impact-mitigating means is a stopper, provided at the fixed arm, upon which the operation lever hits before the operating shaft reaches an open-side end of the elongate hole.

(2) The impact-mitigating means is a decelerating portion provided at an open-side end of the elongate hole to reduce the speed of the operating shaft.

(3) The impact-mitigating means comprises an impact-absorbing plate deformably provided at the movable arm and a cord-like member connecting the impact-absorbing plate with the fixed arm so that the cord-like member may generate tension between the impact-absorbing plate and the fixed arm as the movable arm opens from the fixed arm.

Contents of Japanese patent application No. 2003-392004 (filed on Nov. 21, 2003), No. 2004-028172 (filed on Feb. 4, 2004), No. 2004-028173 (filed on Feb. 4, 2004) and No. 2004-060577 (filed on Mar. 4, 2004) of which convention priorities are all claimed in this application are entirely incorporated herein by reference.

For a better understanding the invention, reference is made to the attached drawings, wherein.

BEST MODES FOR CARRYING OUT THE INVENTION

In the following, preferred embodiments of the present invention will be explained with reference to the attached drawings.

FIGS. 1 to 6 illustrate a preferred embodiment of the present invention.

Figure 1:
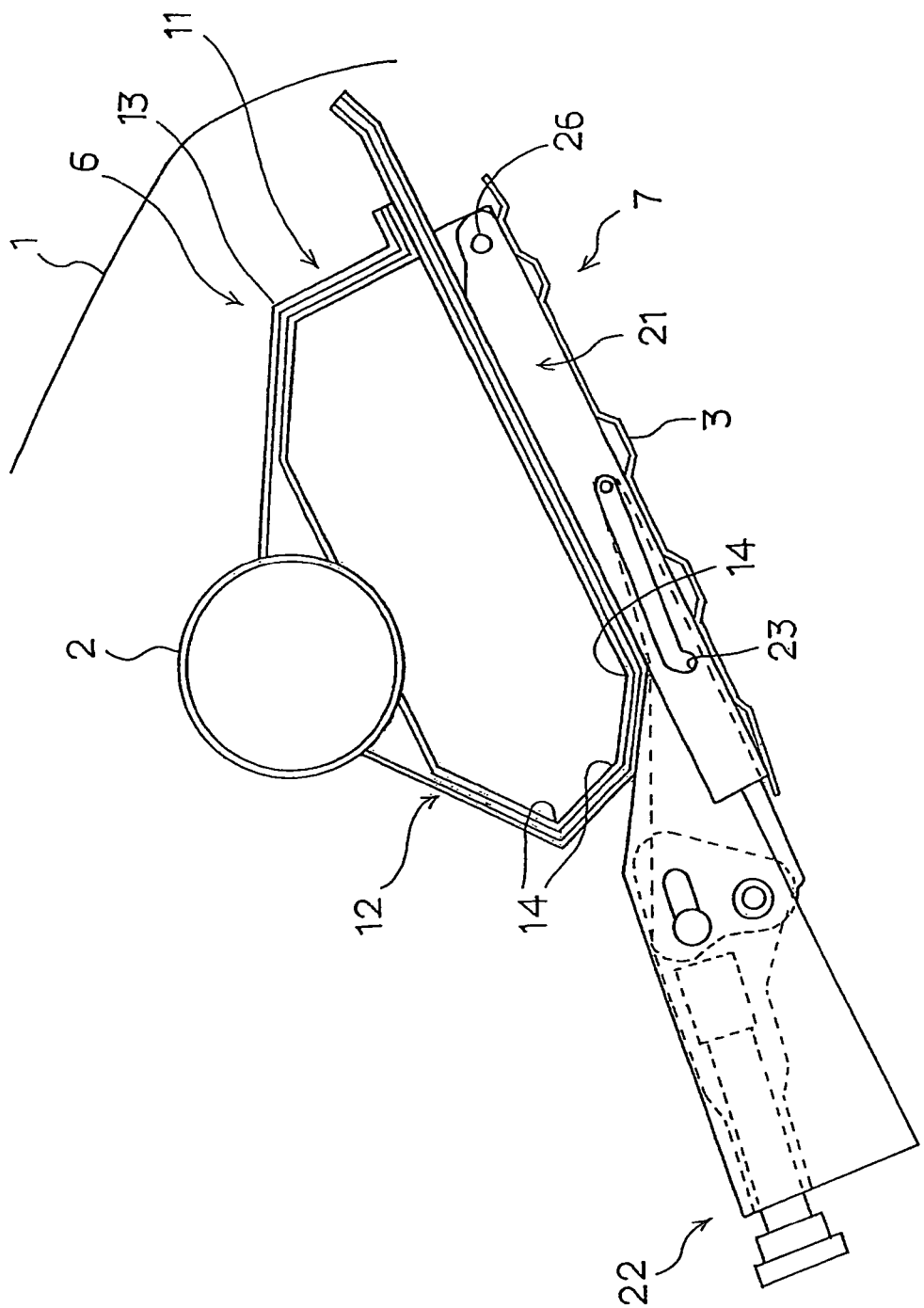
FIG. 1 is a side view of a first embodiment of the knee bolster structure according to the present invention in a closed sate.

Referring to FIG. 1, an instrument panel 1 is provided at a front portion of an interior of a vehicle such as an automobile. A vehicle body-side member 2 such as a steering support member is provided inside the interior of the instrument panel 1. The vehicle body-side member 2 is a reinforcing member, which extends substantially horizontally in a width direction of the vehicle and is connected between right and left side frames of the vehicle body. A steering column not shown is attached to a driver seat side of the vehicle body-side member 2.

Figure 2:
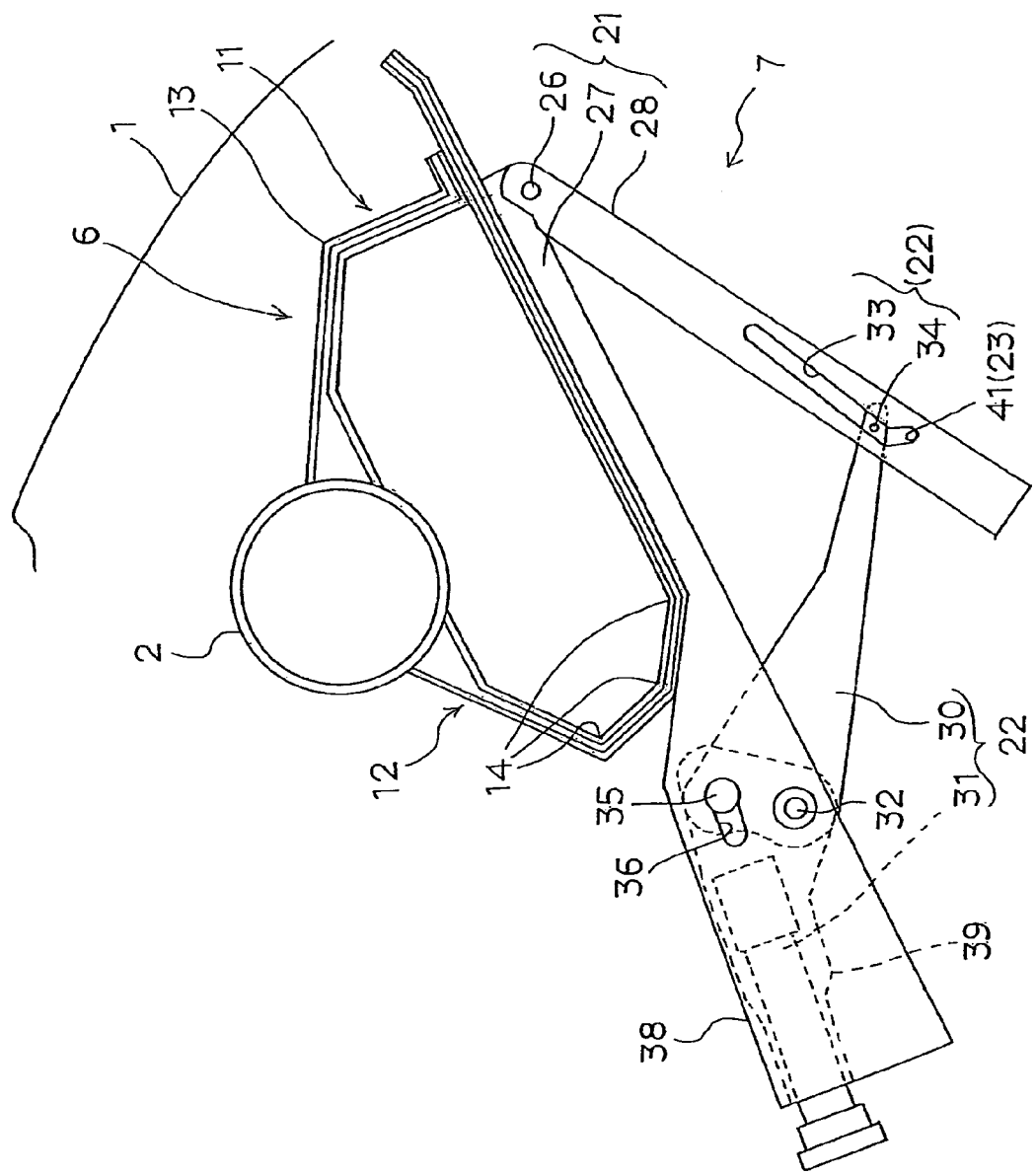
FIG. 2 is a side view of the first embodiment of the knee bolster structure of the present invention as in FIG. 1 in an opened state in which a movable arm is opened from a fixed arm.

As shown in FIGS. 1 and 2, a knee-receiving member 3, which receives input energy from knees of a driver or front-seat passenger, is attached to the vehicle body-side member 2 as described later. The knee-receiving member 3 is arranged in a portion forming a foot space for the driver or front-seat passenger under the instrument panel 1 in such a manner that the member 3 is inclined downwardly toward the front side of the vehicle. The knee-receiving member 3 is stored in such a retracted position that the foot space may be ensured wide at a non-use time. The member 3 moves to a knee-receiving position at a use time. This knee-receiving member is provided at least one of the driver-seat side and the front passenger side. The knee-receiving member 3 has such an almost flat planar shape that it can receive the input energy from the knees at a wide area or that the member can receive both the knees of the driver or the front-seat passenger simultaneously.

The knee bolster structure comprises an impact-absorbing section 6 for absorbing the input energy from the knees of the driver or the front-seat passenger when the knees hit the member and a knee-receiving member movement section 7 for moving the knee-receiving member 3 from the retracted position to the knee-receiving position in addition to the knee-receiving member 3. The knee-receiving member 3 is attached indirectly to the vehicle-side member 2 via the impact-absorbing section and the knee-receiving member movement section 7. In the present invention, the impact-absorbing section 6 is structurally separated from the knee-receiving member movement section 7, so that different functions are afforded upon the portions 6 and 7, respectively. The impact-absorbing section 6 and the knee-receiving member movement section 7 are designed to be combined together.

More specifically, the impact-absorbing section 6 comprises two divided portions arranged vertically or at two vertically different levels as viewed totally: an upper impact-absorbing portion 11 capable of absorbing the input energy of knees of a driver or a front-seat passenger having an average physique or a relatively large physique and a lower impact-absorbing portion 12 capable of absorbing the input energy of knees of a driver or a front-seat passenger having a relatively small physique. The upper impact-absorbing portion 11 is constructed to receive the input energy of the knees mainly at an upper portion of the knee-receiving member 3. On the other hand, the lower impact-absorbing portion 12 is constructed to receive the input energy from the knees mainly at a lower portion of the knee-receiving member 3.

Difference in strength is given between the upper and lower impact-absorbing portions 11 and 12 such that the receiving strength of the former is greater and that of the latter is smaller. For this purpose, the extending dimension of the upper impact-absorbing portion 11 is made shorter, while that of the lower impact-absorbing portion 12 is made longer, so that the strength difference is afforded due to the difference in length. Alternatively, it may be that the thickness of the upper impact-absorbing portion 11 is made larger, while that of the lower impact-absorbing portion 12 is made smaller, so that the strength difference is afforded due to the difference in thickness. Alternatively, it may be that the sectional shape of the upper impact-absorbing portion 11 is made larger, while that of the lower impact-absorbing portion 12 is made smaller, so that the strength difference is afforded due to the difference in sectional shape. Further, strength difference may be afforded by using other means than described above. Furthermore, strength difference may be afforded by providing the number of a bendable portion or bendable portions for each of the upper impact-absorbing portion and the lower impact-absorbing portion such that the numbers of the bendable portions are different between the upper and lower impact-absorbing portions. Moreover, difference in strength may be afforded by combining any of the above measures.

A base end of the above impact-absorbing portion 11 is connected to a vehicle-rear side of the vehicle body-side member 2, and has an almost inverse V-letter shape as viewed from its side, with a bent portion 13 at its intermediate portion, which can absorb input energy of the knees of the driver or front-seat passenger having the average physique or relatively large physique. A base end of the lower impact-absorbing portion 12 is connected to a vehicle front side of the vehicle body-side member 2, and has an inverse folded U-letter shape as viewed from its side, with a plurality of bent portions 14 (three bent portions in FIG. 1) at its intermediate portion, which can absorb input energy of the knees of the driver or front-seat passenger having the smaller physique. That is, repulsion force of each of the upper and lower impact-absorbing portions 11 and 12 against the input energy of the knees is set by adjusting the number of the bent portion(s) 13, 14. A tip end of the upper impact-absorbing portion 11 is connected to a rear face (upper face) of the lower impact-absorbing portion 12 which is turned from the vehicle-front side to the vehicle-rear side around the vehicle body-side member 2.

On the other hand, the knee-receiving member movement section 7 is adapted to turn a lower portion of the knee-receiving member 3 rearward (toward the driver or front-seat passenger) so that the knee-receiving member 3 can receive the input energy from the knees of the driver or the front passenger having the smaller physique at an earlier point of time. The knee-receiving member movement section 7 comprises a moving mechanism 21, an actuating mechanism 22 for actuating the moving mechanism 21 and a holding mechanism 23 for holding the moving mechanism in an operating state.

As shown in FIGS. 2 to 6, the moving mechanism comprises a fixed arm 27 and a movable arm 28, and the movable arm 28 is connected to the fixed arm 27 at their upper end portions with a hinge 26, while the lower end portion of the movable arm 28 can be opened relative to the fixed arm 27. The moving mechanism 22 comprises an operating lever 30 for opening the movable frame 28 relative to the fixed arm 27 and a lever-driving mechanism 31 for driving the operating lever 30. The holding mechanism 23 is to hold the movable arm 28 in the opened state, and is provided mainly in the movable arm 28 as mentioned later.

Figure 4:
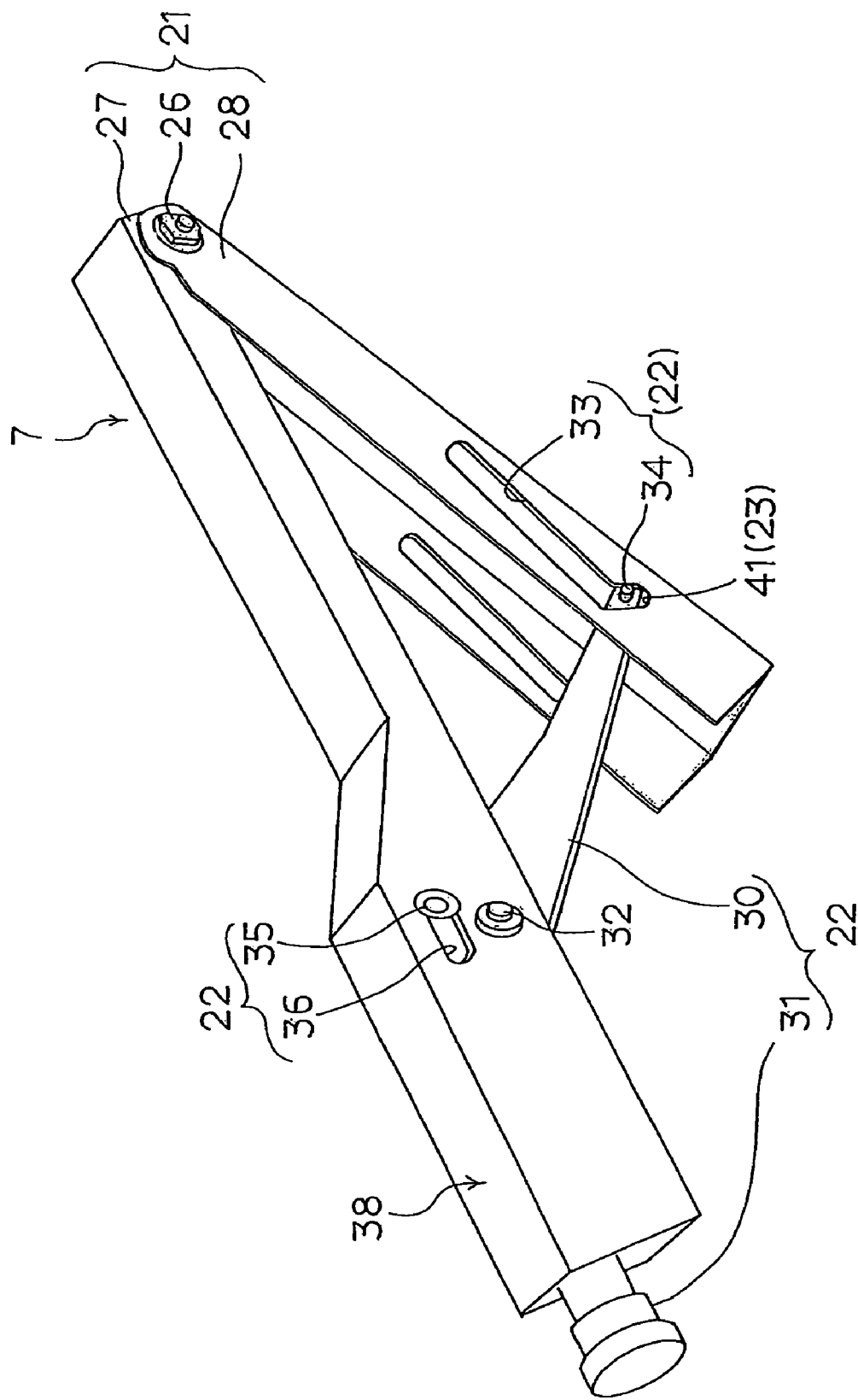
FIG. 4 is a perspective view of showing the state of the movable arm, the fixed arm, an operating mechanism and the holding mechanism in FIG. 3.

As shown in FIG. 4, the fixed arm 27 has a channel-like sectional shape opened almost downwardly (inversed box- or cup-like sectional shape), whereas the movable arm 28 has a channel-like sectional shape opened almost upwardly (box- or cup-like sectional shape). The movable arm 28 has the sectional shape so slightly larger than that of the fixed arm 27 that the former may be externally fitted to the latter 27. One end of the operating lever 30 is supported at a side of the fixed arm 27 at an intermediate portion by using a supporting shaft 32, while its other end is slidably fitted to an elongate hole 33 formed in sides of the movable arm 28 at its intermediate portion by using an operating shaft 34. The elongate hole 33 is extended almost straight relatively long, forming a slight angle relative to the longitudinal direction of the movable arm 28 as inclined in FIG. 4. The operating lever 30 is so designed that the lever can be fitted in a compact state within the movable frame 28 and the fixed arm 27 when they are closed. In this embodiment, a pair of such levers are provided. The operation lever 30 has a channel-like shape opened almost downwardly and having a sectional shape slightly smaller than the movable arm 28. When the arms are closed, a tip end portion of the operating lever from the supporting shaft 32 to the operating shaft 34 is housed inside the movable arm 28 and the fixed arm 27. The movable arm 28 has a length slightly shorter than the distance from the hinge 26 to the supporting shaft 32, so that when the arms are closed, the movable arm 28 can be fitted externally to the fixed arm 27 without the lower end portion of the movable arm interfering the supporting shaft 32.

An actuator such as an explosion-type cylinder which is extended with an explosive force of an explosive or the like may be used for the lever-driving mechanism 31, for example. A tip of a rod of the explosion type cylinder as the lever-driving mechanism 31 is fixed near the supporting shaft 32 of the operating lever 30 by using an input shaft 35, which is slidably fitted into elongate holes 36 formed in sides of the fixed arm 27. The elongate hole 36 adjusts deviation in motion between a straight movement of the rod of the explosion type cylinder and the turning movement of the operating lever 30. The elongate hole is designed relatively short.

Further, the fixed arm 27 is formed with a section-enlarged portion 38 capable of housing the lever-driving mechanism 31 at a lower end from a portion where the movable arm 28 is externally fitted to the fixed arm 27. The lever-driving mechanism 31 is housed and fitted in an interior of the section-enlarged portion 38 via a fitting bracket 39.

The locations of the supporting shaft 32, the operating shaft 34 and the input shaft 35 and the angles and the lengths of the elongate holes 33 and 35 are selected such that the movable arm 28 can be moved to the knee-receiving position from a state in which the movable arm 28 and the lever-driving mechanism 31 are housed inside the fixed arm 27 and the movable arm 28 when they are closed.

The holding mechanism 23 is constructed by a return-preventing bent portion 41 formed in a lower end of the elongate hole 33 (end at the opened side). The bent portion 41 well functions by appropriately adjusting the angle between the bent portion and the elongate hole 33. Alternatively, a return-preventing narrowed portion 42 may be formed at an inlet portion of the bent portion 41, thereby narrowing the width of the elongate hole 33. The width of the elongate hole at the narrowed portion 42 is made smaller than the diameter of the operating shaft 34.

Figure 6:
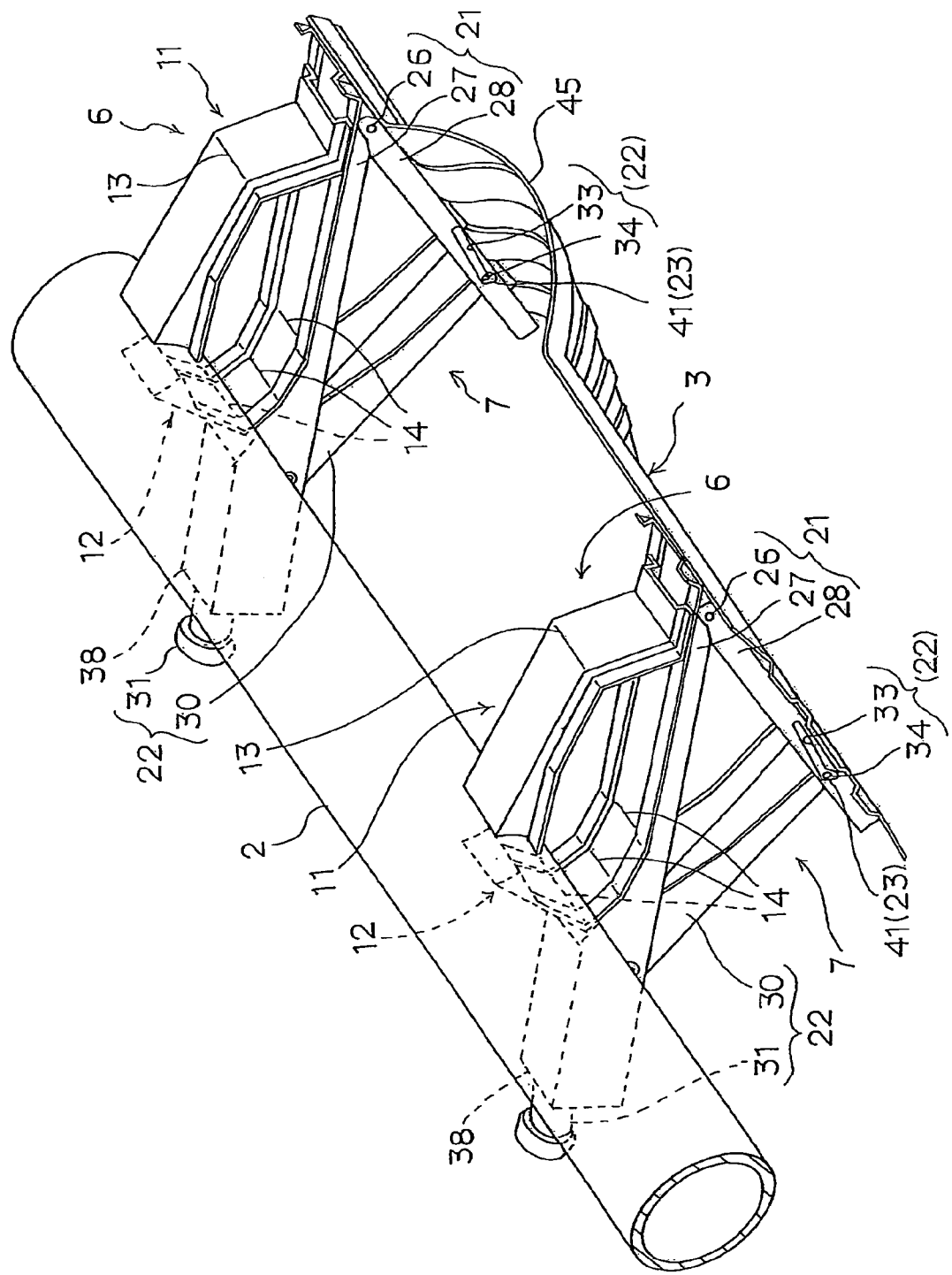
FIG. 6 is a perspective view of the entire knee bolster apparatus in FIG. 3.

The impact-absorbing section 6 and the knee-receiving member movement section 7 structurally separate are connected by attaching the fixed arm 27 to the lower impact-absorbing portion 12 as shown in FIGS. 1, 2 and 6. The lower impact-absorbing portion 12 is attached to the fixed arm 27 by spot welding or the like. The knee-receiving member movement section 7 has such strength that it will not collapse before the impact-absorbing section 6 is collapsed.

As shown in FIG. 6, a pair of the impact-absorbing sections 6 and a pair of the knee-receiving member movement sections 7 are provided right and left for the knee-receiving member, corresponding to both the knees of the driver or the front-seat passenger. The knee-receiving member 3 is attached to connect the movable arms 28 of the right and left knee-receiving member movement sections 7, respectively. When the knee bolster structure is provided at the driver's seat side, the knee-receiving member may be provided at its central portion with a column-shaped detour 45 extending almost vertically from the upper side to the lower side thereof and having a shape projecting toward the rear side of the vehicle, if necessary, so that the knee-receiving member may be prevented from interfering with the steering column. A decorating member or the like may be attached to the front surface of the knee-receiving member 3.

Next, operation of this embodiment will be explained.

As shown in FIG. 1, the fixed arm 27 and the movable arm 28 of the moving mechanism 21 of the knee-receiving member movement section 7 are closed when the knee bolster structure is under no operation.

When an excess load is applied to the vehicle, the explosion type cylinder as the lever-driving mechanism 31 is extended to push the input shaft 35 with the rod of the cylinder, so that the operation lever 30 is turned around the supporting shaft 32. As shown in FIG. 2, the operating shaft 34 at the tip end of the operation lever 30 slides along the elongate hole 33 formed in the movable arm 28, so that the movable arm 28 and the lower portion of the knee-receiving member 3 are displaced to the knee-receiving position on the vehicle-rear side around the hinge 26. Thereby, the movable arm 28 is opened from the fixed arm 27.

Figure 5:
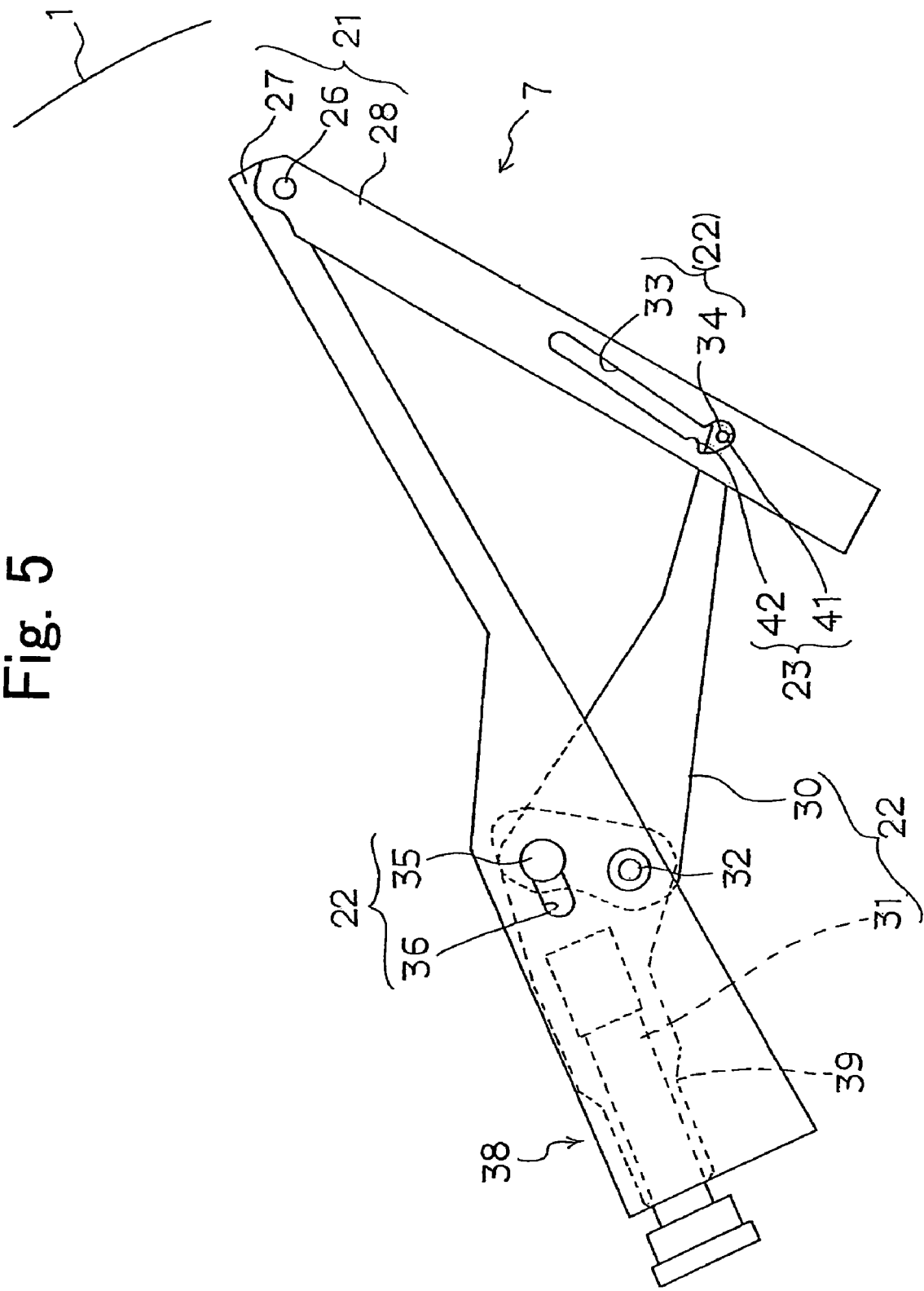
FIG. 5 is a side view similar to FIG. 3, provided that a throttled portion is provided as the holding mechanism.

Then, the knees of the driver or the passenger hit the knee-receiving member 3 projecting up to the knee-receiving position, the knee-receiving member 3 is pushed back, so that as shown in FIG. 3 to FIG. 6, the operating shaft 34 at the tip portion of the operating lever 30 enters the bent portion 41 of the elongate hole 33. Consequently, the holding mechanism exhibits the holding function or the return-preventing function, and the operating lever 30 supports the knee-receiving member so that the knee-receiving member will not be moved back. As shown in FIG. 5, the above holding function or the return-preventing function is exhibited when the operating shaft 34 overrides the narrowing portion 42.

The knees of the driver or the front-seat passenger having the average physique or relatively large physique will butt the upper portion of the knee-receiving member 3. On the other hand, the knees of the driver or the front-seat passenger having the relatively small physique will butt the upper portion of the knee-receiving member 3. Thus, since the lower portion of the knee-receiving member 3 is displaced rearward, the member can receive input energy of the driver or the front-seat passenger having the relatively small physique at an earlier point of time.

Thereafter, the impact-absorbing section 6 absorbs the input energy of the knees of the driver or the front-seat passenger having the average physique or relatively large physique as mainly the upper impact-absorbing portion 11 is deformed. On the other hand, the impact-absorbing section 6 absorbs the input energy of the knees of the driver or the front-seat passenger having the relatively small physique as mainly the lower impact-absorbing portion 12 is deformed.

In this way, when the impact-receiving member is divided into two portions vertically arranged: the upper impact-receiving portion 11 and the lower impact-receiving portion 12 and difference in strength is also afforded upon the upper and lower impact-receiving portions 11 and 12 in that receiving strength of the upper impact-receiving portion 11 is higher than that of the lower impact-receiving portion 12, the upper impact-absorbing portion 11 is adapted to appropriately absorb the input energy of the knees of the driver or the front-seat passenger having the average physique or relatively large physique, whereas the lower impact-absorbing portion 12 is adapted to appropriately absorb the input energy of the knees of the driver or the front-seat passenger having the relatively small physique. Thus, according to the present invention, the receiving strength can change to cope with persons having different physiques. Consequently, the knee bolster structure according to the present invention can be afforded with the function to appropriately cope with various persons having different physiques.

In addition, according to this embodiment, the impact-absorbing section 6 and the knee-receiving member movement section 7 are structurally separated depending upon their functions, respectively and can be combined together. Therefore, when plural kinds of the impact-absorbing sections 6 and plural kinds of the knee-receiving member movement sections 7 are preliminarily prepared, desired knee bolster structures can be constructed for various kinds of vehicles such as automobiles by appropriately combining the impact-absorbing sections and the knee-receiving member movement sections 7. Further, with respect to automobiles having similar standards such as shapes and qualities of the instrument panel 1 and their surrounding, when a common part is used for either one of the impact-absorbing section 6 and the knee-receiving member movement section 7 and readily modified parts having dimensions slightly changed are used for the other, appropriate knee bolster structures can be easily constructed by using the common part, thereby to cope with various vehicles. Therefore, reduction in costs and developing time periods can be realized.

Since the movable arm 28 is designed to have the sectional shape slightly larger than that of the fixed arm 27 and the former is externally fitted to the latter, the movable arm 28 to which the knee-receiving member 3 is directly attached can be reinforced. Therefore, the strength of the entire knee-receiving member movement section 7 can be easily ensured.

Figure 3:
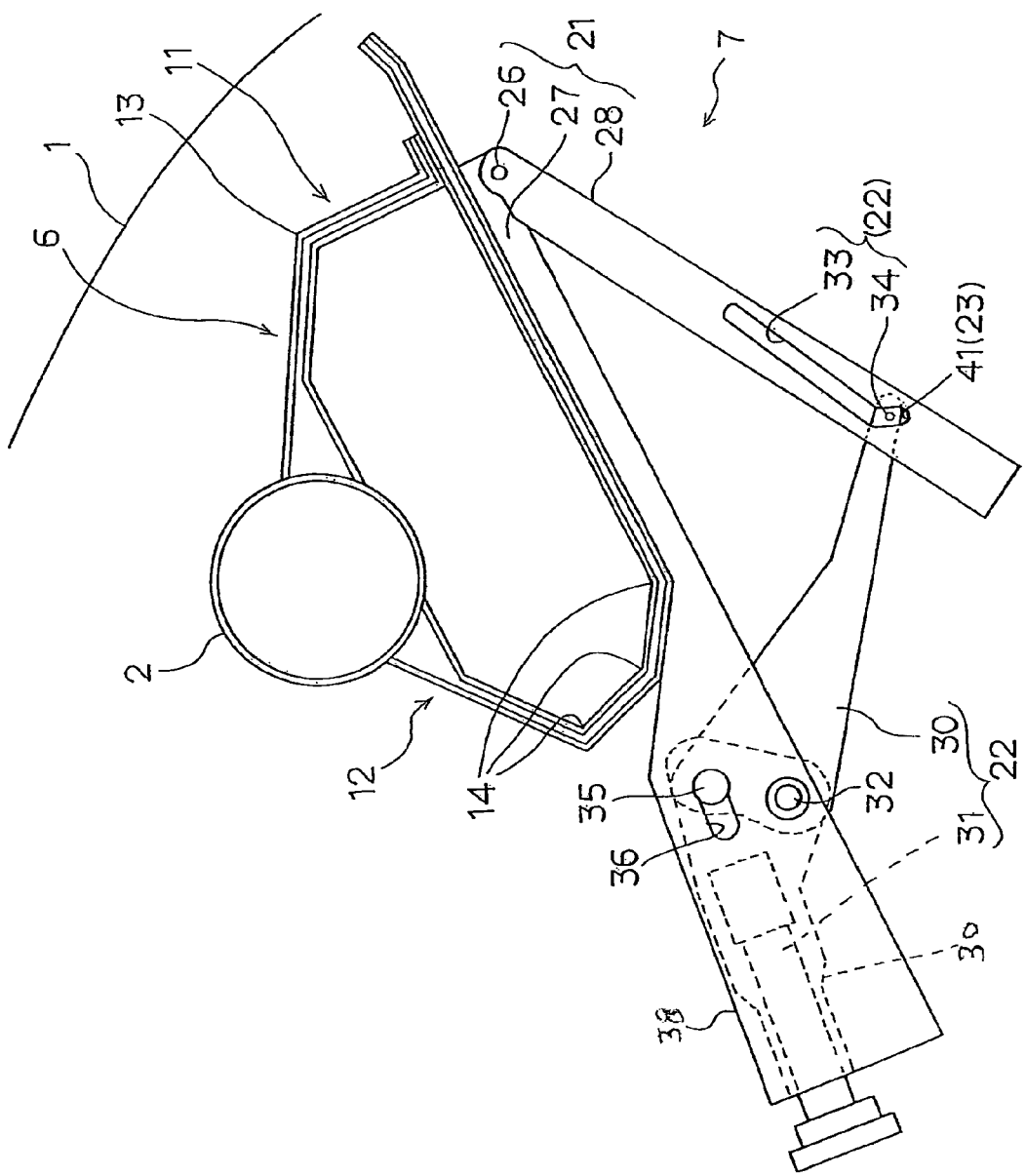
FIG. 3 is a side view of the first embodiment of the knee bolster structure according to the present invention in which a holding mechanism is operating.

Further, since the width between the opposite sides of the movable arm 28 having the channel-like shape is increased by enlarging the sectional shape of the movable arm 28, the elongate hole 33 and the holding mechanism 23 such as the bent portion 41 can be advantageously provided in the movable arm 28. Therefore, the holding force of the holding mechanism 23 can be further increased, or the holding mechanism can be made to assuredly function. For example, when the elongate hole 33 is formed obliquely to the longitudinal direction of the movable arm 28 as shown in FIGS. 2, 3 and 4, the bent portion 41 can be made longer, or the bent angle of the bent portion 41 can be made greater relative to the elongate hole 33. Consequently, once the operating shaft 34 enters the bent portion 41, the shaft cannot come out from there.

This embodiment of the present invention, which has been explained in detail based on the attached FIGS. 1 to 6, is merely an example of the present invention. Thus, the invention is not limited to the construction of this embodiment only, and as a matter of course any modifications, various and changes made in design with the purview of the invention are encompassed by the present invention unless they depart from the gist of the invention.

Now, another preferred embodiment of the present invention will be explained with reference to FIGS. 7 to 13. In these figures, same or similar parts are denoted by same reference numerals given in FIGS. 1 to 6, and explanation of such parts will be partially omitted.

In this embodiment, a fixed arm 27 also has a channel-like sectional shape opened almost downwardly. A movable arm 28 also has a channel-like shape opened almost upwardly. The movable arm 28 has a sectional shape slightly smaller than that of the fixed arm 27, so that the movable arm 28 is fitted and housed into the fixed arm 27. An operating lever 30 is supported, at its intermediate portion, by using a supporting shaft 32 at sides of the fixed arm 27, while its other end is slidably fitted to an elongate hole 33 formed in sides of the movable arm 28 at its intermediate portion by using an operating shaft 34. The elongate hole 33 is extended almost straight relatively long almost in a longitudinal direction of the movable shaft 28. The operating lever 30 bar a downwardly opened channel-like sectional shape so slightly smaller than the movable arm 28 that a tip portion of the lever from the supporting shaft 32 to the operating shaft 34 can be fitted in a compact state within the movable frame 28 and the fixed arm 27 when they are closed. The movable arm 28 has a length slightly shorter than the distance from the hinge 26 to the supporting shaft 32, so that when the arms are closed, the movable arm 28 can be fitted externally to the fixed arm 27 without the lower end portion of the movable arm 28 interfering the supporting shaft 32.

An actuator such as an explosion-type cylinder which is extended with an explosive force of an explosive may be used for the lever-driving mechanism 31, for example. A tip of a rod of the explosion type cylinder as the lever-driving mechanism 31 is fixed to an input shaft 35 which is slidably fitted into an elongate hole 36 formed in sides of a tip portion of the operating lever 30. The elongate hole 36 adjusts deviation in motion between a straight movement of the rod of the explosion type cylinder and the turning movement of the operating lever 30. The elongate hole may be designed short.

Further, a cut portion 60 is formed on an upper face of a lower side than an upper portion of the fixed arm 27 having the almost downwardly opened channel-like shape in which the movable arm 28 is fitted, and the lever-driving mechanism 31 is attached to the cut portion 60 of the fixed arm by fitting brackets 61. The brackets 61 each have a split shape, and the lever-operating mechanism 31 is tightly fixed to the fixed arm with bolts in the state that the lever-driving mechanism 31 is sandwiched between split bracket pieces of the brackets 61. A base portion of the operating lever 20 positioned from the supporting shaft 32 to the input shaft 35 is almost projected upward from the cutaway portion 60 over the fixed arm 27.

Further, the lever-driving mechanism 31 is provided with a retaining mechanism 62 for preventing the rod of the explosion type cylinder. The retaining mechanism 62 has a structure similar to a ratchet mechanism, for example.

The impact-absorbing section 6 and the knee-receiving member movement section 7 structurally separated are connected by attaching the fixed arm to a lower face of a part of the lower impact-absorbing portion 12. The fixed arm 27 is attached to the lower face of that part of the lower impact-absorbing portion 12 by spot welding (spot welded portions 42 in FIG. 8). The knee-receiving member movement section 7 has such strength that it will not collapse before the impact-absorbing section does.

In this embodiment, an impact-mitigating mechanism 50 is further provided, which mitigates impact force generated in the operating shaft 34 when the movement mechanism 21 operates.

For example, the impact-mitigating mechanism 50 may be constructed by providing, at a fixed arm 27, a stopper 51 which the operating lever 30 butts immediately before the operating shaft 34 reaches the end on the opening side of the elongate bole 33. More specifically, the stopper 51 is formed by appropriately upwardly extending the cut portion 60 at an intermediate portion of the fixed arm 27 and bending it sidewise.

Further, it may be that plural impact-mitigating mechanisms 50 are provided at plural stages so that they function stepwise to enhance certainty of the impact-mitigating function. Such an embodiment of the impact-mitigating mechanism 50 may be constituted by an impact-absorbing plate 53 and a cord member 54. The impact-absorbing plate 53 is deformably provided at the movable arm 28, and the cord member 54 connects the impact-absorbing plate 63 to the cord member fixed arm 27 to generate tension between them when the fixed and movable arms are opened. The impact-mitigating mechanism 50, which is constituted by the impact-absorbing plate 53 and the cord member 54, is deemed to be a speed reduction mechanism 55. The impact-absorbing plate 53 is extended from a lower end of the movable arm 28. A wire may be used as the cord member 54, for example. Preferably, the cord member 54 is tightly connected to a lower end of the impact-absorbing plate 53 and a fitting portion of the supporting shaft 32 of the fixed arm 27. The impact-mitigating function afforded by the impact-absorbing plate 53 and the cord member 54 begins to work before the operating lever 30 hits the stopper member 51. The impact-mitigating power with the impact-absorbing plate 53 can be finely adjusted by selecting the thickness, width and length of the impact-mitigating plate 53. Timing at which the cord member 54 generates the impact-mitigating function can be finely set by finely adjusting the length thereof.

In this embodiment, a pair of the impact-absorbing sections 6 and a pair of the knee-receiving member movement sections 7 are provided corresponding to the knees of the driver or the front-seat passenger. Therefore, the knee-receiving member 3 is attached to connect the right and left movable arms of the knee-receiving member movement sections 7. When the knee-receiving member 3 is provided at the driver seat side, a column detour portion having a vehicle-reward projecting shape may be vertically formed in a central portion of the knee-receiving member 3 from an upper side to a lower side thereof at need to avoid interference between the knee-receiving member 3 and a steering column. A decorating member may be attached to a front surface of the knee-receiving member 3.

Next, the function of this embodiment will be explained.

Figure 7:
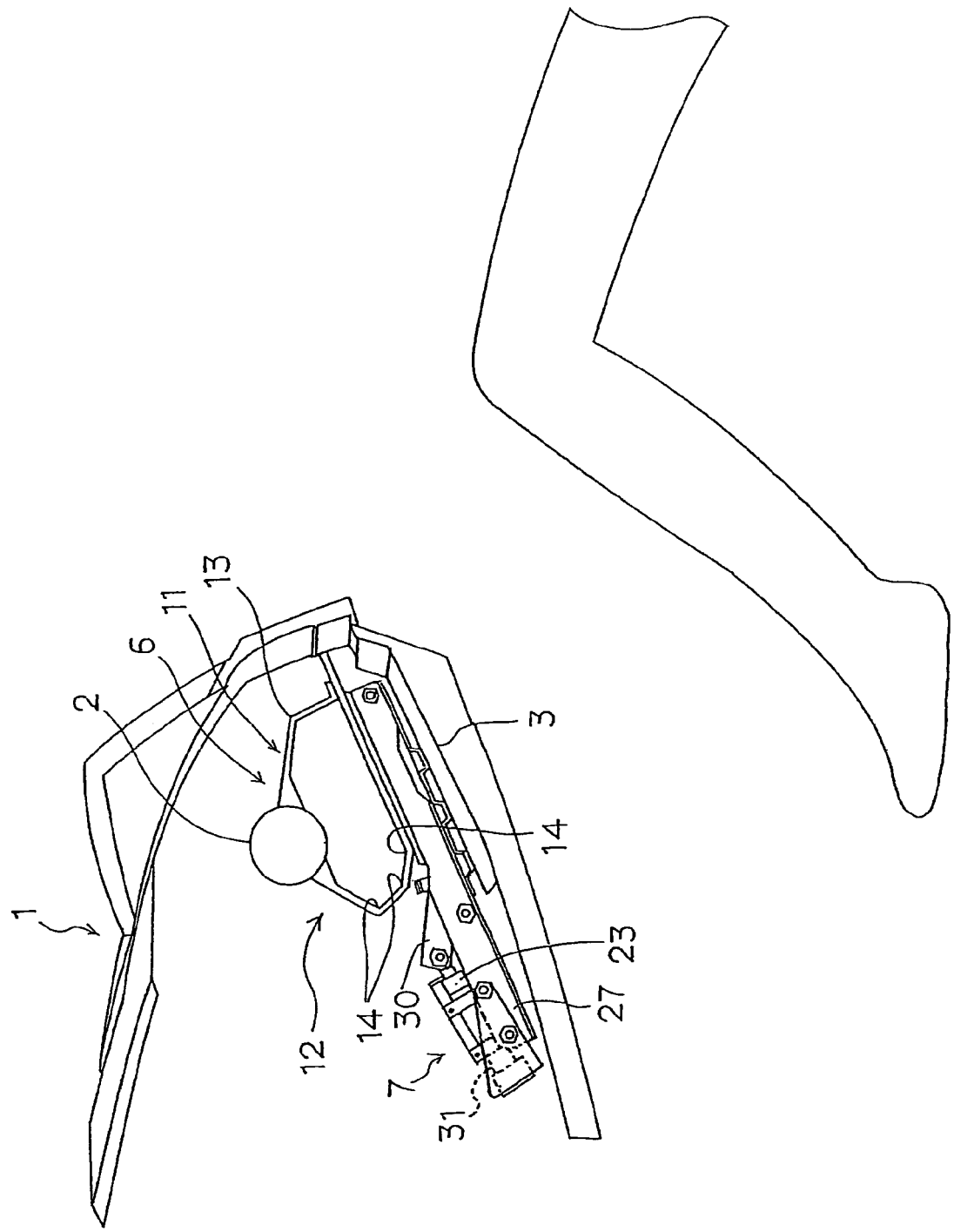
FIG. 7 is a side view of a second embodiment of the entire knee bolster structure in a closed state.
Figure 8:
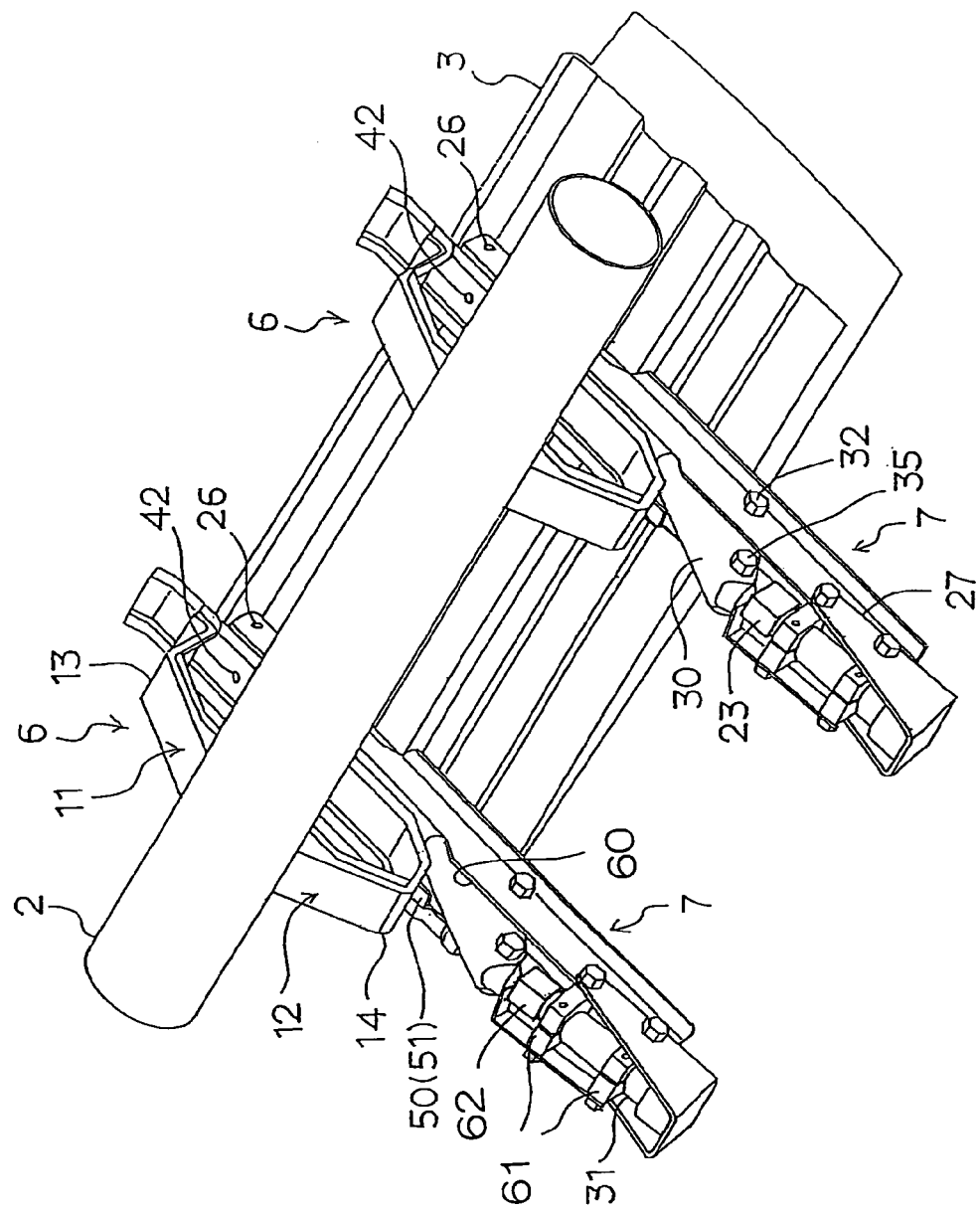
FIG. 8 is a partially perspective view of FIG. 7 as viewed from a front side of a vehicle.
Figure 9:
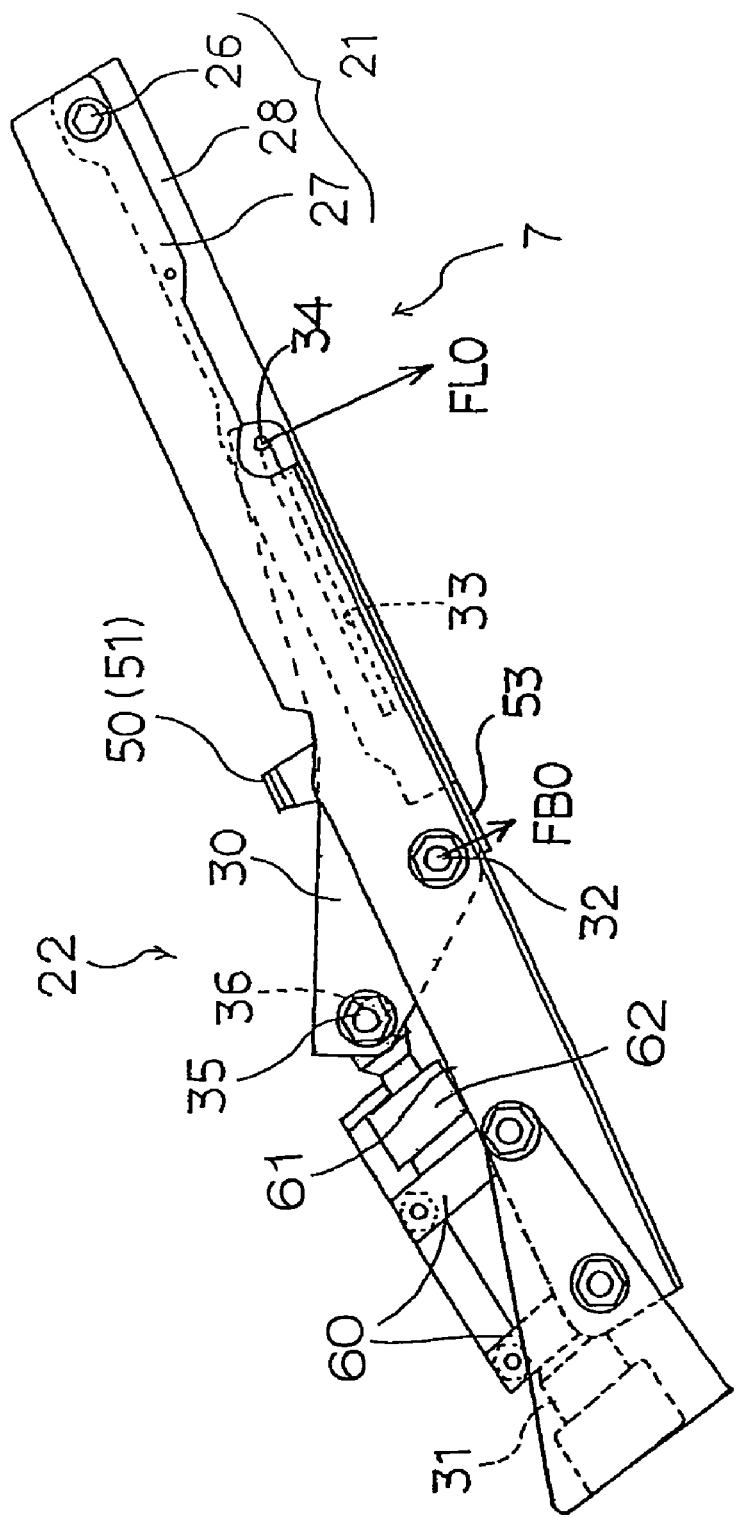
FIG. 9 is an enlarged side view of a part of the knee bolster structure in FIG. 8.

As shown in FIG. 7 to FIG. 9, the fixed arm 27 and the movable arm 28 of the movement mechanism 21 of the knee-receiving member movement section 7 are closed when the knee bolster structure is in no use.

Figure 10:
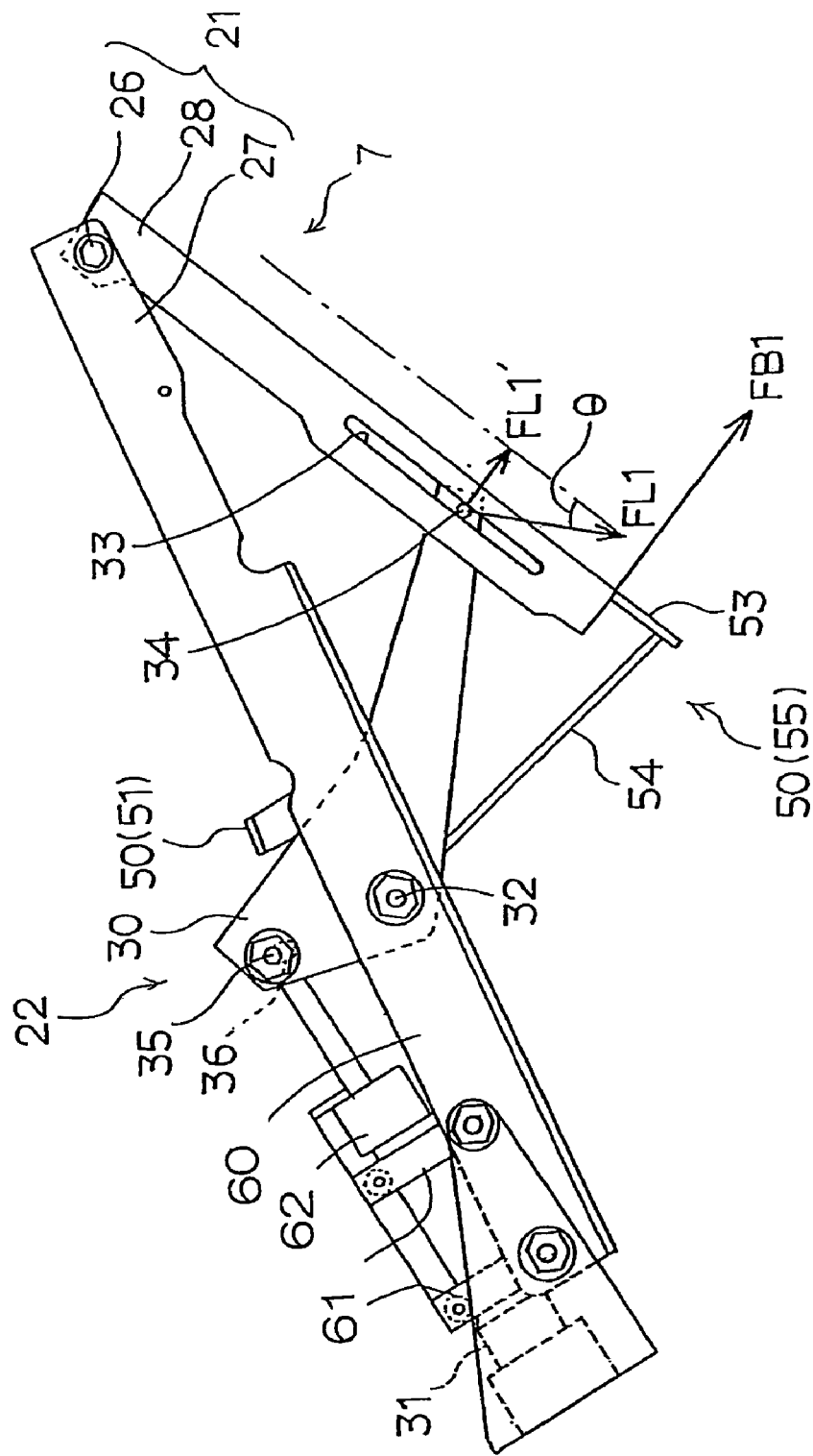
FIG. 10 is a side view of FIG. 9 in an opened state in which a movable arm is opened from a fixed arm.
Figure 11:
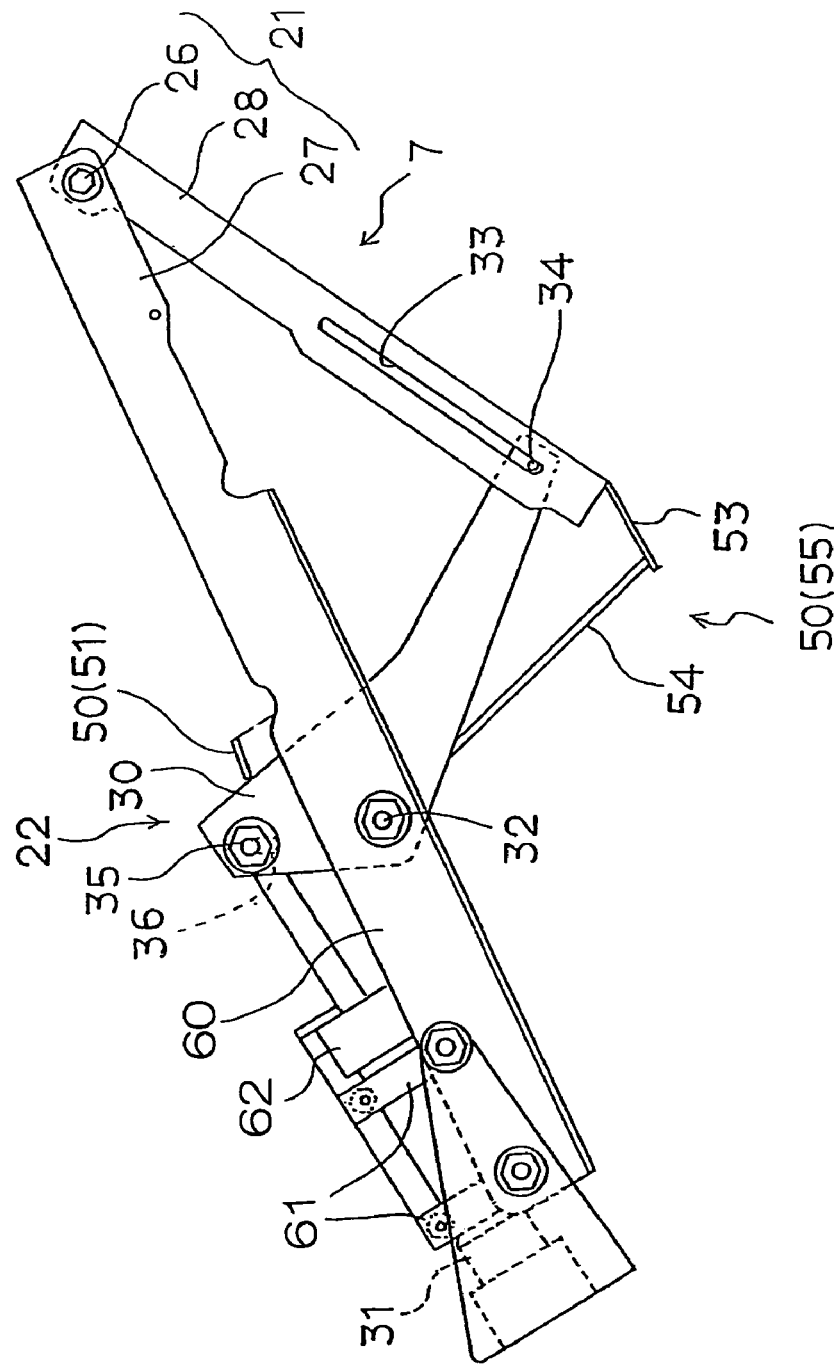
FIG. 11 is a side view of FIG. 9 in a completely opened state in which the movable arm is completely opened from the fixed arm.
Figure 12:
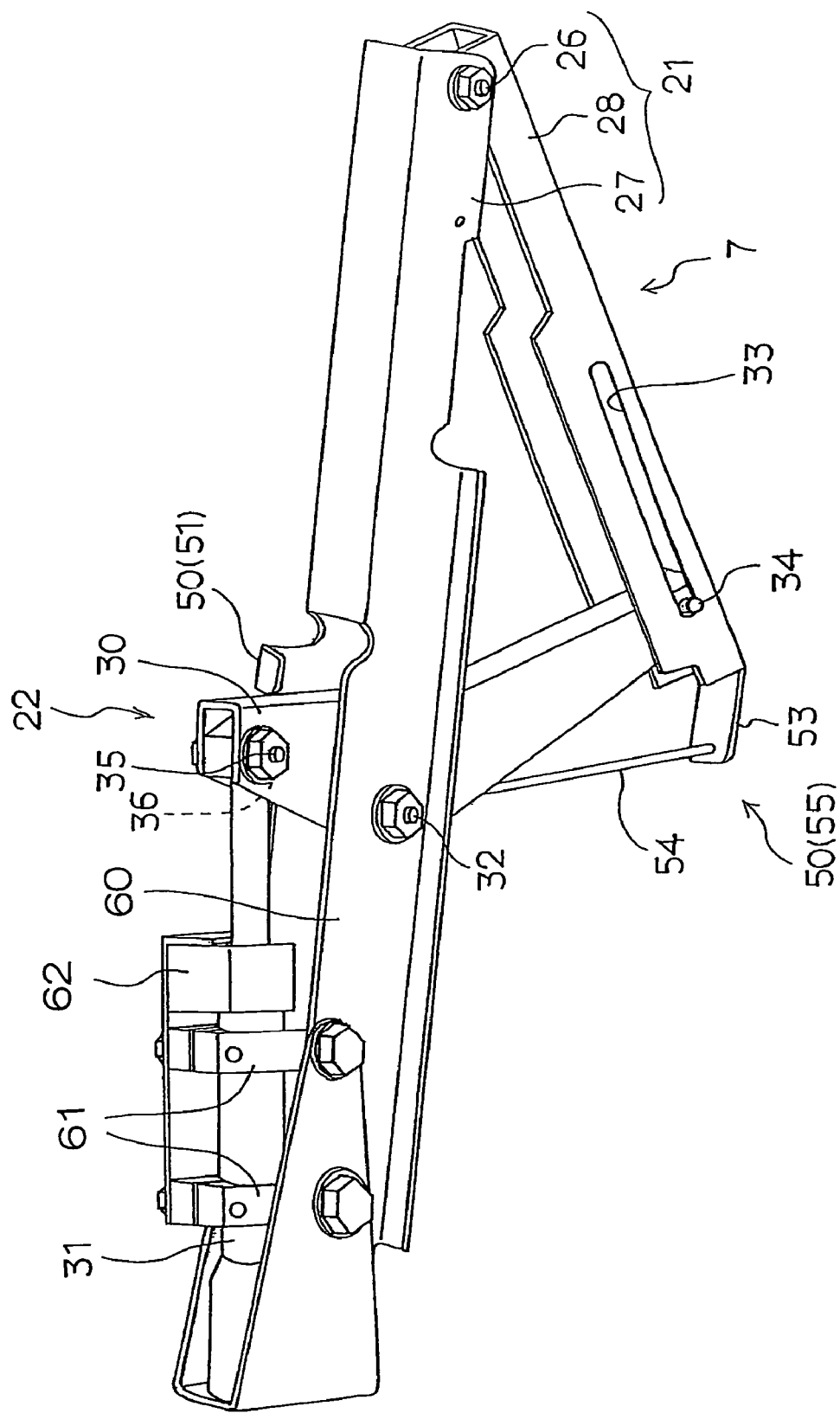
FIG. 12 is a perspective view of FIG. 11.
Figure 13:
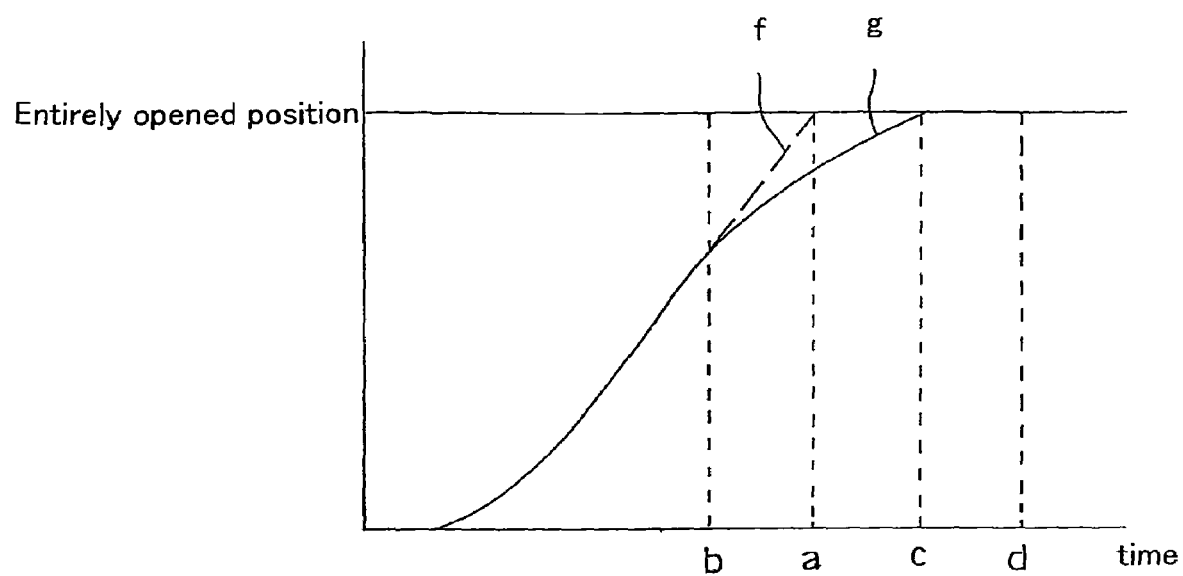
FIG. 13 is a graph showing a timing of deformation of an impact-absorbing plate.

When an excess load is applied, the explosion type cylinder as the lever-driving mechanism 31 is extended to make the rod of the cylinder push the input shaft 35, so that the operation lever 30 is turned around the supporting shaft 32. Thereby, as shown in FIGS. 10, 11 and 12, the operating shaft 34 at the tip of the operating lever 30 slides along the elongate holes 33 formed in the movable arm 28, and the movable arm 28 and the lower portion of the knee-receiving member 3 move from the retracted position to a rearward knee-receiving portion, and the fixed arm 27 and the movable arm 28 are opened. Then, the retaining mechanism 62 provided at the lever-driving mechanism 31 prevents the rod of the explosion type cylinder from returning. Thereby, the retaining mechanism 62 exhibits the holding function or the return-preventing function, so that the operation lever 30 extends and prevents the knee-receiving member 3 from returning.

At that time, since the explosion type cylinder is used as the lever-driving mechanism 31 for the purpose of rapidly moving the knee-receiving member 3 in a short time, a strong impact force would be applied to the operating shaft 34 and the elongate holes 33 when the movable arm 28 is opened from the movable arm 28. Therefore, it is feared that breakage will occur.

Thus, in this embodiment, the impact-mitigating mechanism 50 is provided to mitigate the impact force which would be generated in the operating shaft 34, and to thereby prevent the breakage around the operating shaft 34 and enhance certainty of the operation. Alternatively, the diameter of the operating shaft 34 can be decreased to increase the latitude in designing. That is, since the operating shaft 34 is slidably fitted into the relatively long elongate holes 33 formed in the sides of the movable arm 28, which gives a structure difficult to ensure strength. The provision of the impact-mitigating mechanism 50 can almost certainly prevent breakage of and around the operating shaft 34 without any reinforcement. Further, although it is difficult to finely adjust the explosion force of the explosion type cylinder, breakage of the operating shaft 34 can be almost certainly prevented by the provision of the impact-mitigating mechanism 50 without finely adjusting the explosion force.

For example, when the operating lever 30 hits the stopper 51 as the impact-mitigating mechanism 50 provided at the fixed arm 27 immediately before the operating shaft 34 reaches the open end of the elongate hole 33, the impact force is borne with the stopper 51, and the impact force acting upon the operating shaft 34 can be reduced accordingly. That is, the stopper 51 functions to bear the impact force, which acts when the operating shaft 34 hits the open end of the elongate hole 33, in place of the operating shaft 34.

Further, another impact-mitigating mechanism 50 can be so provided that it enables plural-stage mitigating function, thereby more effectively performing the impact-mitigating function. In particular, such an impact-mitigating mechanism as performing impact mitigation based on a different principle is more effective.

For example, as shown in FIG. 10, the cord member 54 connecting the fixed arm 27 and the other impact-absorbing plate 53 as another impact-mitigating mechanism 50 generates tension when the movable arm 28 is opened from the fixed arm 27 around the hinge 26. When this tension exceeds a set value, the impact-absorbing plate 53 is deformed (bent) to absorb force acting as the movable arm 28 is further opened, thereby reducing the speed of the movable arm 28. This reduction in speed of the movable arm 28 can reduce the impact force which would be generated in the operating shaft 34 as the shaft further slides along the elongate hole 33. Furthermore, impact force acting when the operating lever 30 is stopped by the stopper 51 and the impact force acting when the operating shaft 34 hits the open end of the elongate hole 33 can be more reduced. The impact-absorbing plate 53 and the cord member 54 function as the speed-reducing mechanism 55 and the impact-mitigating mechanism 50. Since the impact-absorbing plate 53 and the cord member 54 are structurally very simple, they need not large cost and gives no great structural influence. Furthermore, since the impact-absorbing plate 53 is extended from the lower end of the movable arm 28 and the cord member 54 tightly connects the lower end portion of the impact-absorbing plate 53 to the fitting portion of the supporting shaft 32 of the fixed arm 27, the impact-absorbing plate 53 and the cord member 54 more effectively exhibit the speed-reducing function and the impact-mitigating function for the movable arm 28 moving along a circle around the hinge 26.

In addition, since the impact-mitigating mechanisms 50 provided at plural stages are made to work successively with their working timings being staggered (at plural stages), the function of each of the impact-mitigating mechanisms 50 can be effectively exhibited to realize the totally maximum effect, and designing and setting of each of the impact-mitigating mechanisms 50 can be simplified.

For example, when the impact-absorbing plate 53 and the cord-shaped member 54 first begin to exhibit the impact-mitigating function against the movable arm 28 accelerated with the explosion force of the explosion type cylinder, the speed of the movable shaft 28 is reduced. Thereafter, the operating lever 30 hits the stopper 51, and finally the operating shaft 34 reaches the open ends of the elongate holes 33. Thereby, two contradictory functions: the function of rapidly moving the knee-receiving member 3 to the knee-receiving position and the function of stopping the knee-receiving member 3 as softly as possible and preventing the breakage of the knee-receiving member movement section 7 can be both realized by the simple and inexpensive structure.

Here, the timings when the impact-absorbing plate 58 and the cord member 54 begin to exhibit the impact-mitigating function are set as follows, for example.

First, when the movable arm 28 is at an opening initial stage, force FLO is generated in the operating shaft 34 provided at the tip of the operating lever 30 in a direction tangential to a circle around the supporting shaft 32. Force FBO acts upon the tip of the movable arm 28 in a direction tangential to a circle around the hinge 26. At this point of time, both the directions are almost common. The relationship between these forces at this time is such that the force upon the operating lever 30 directly receiving input from the explosion type cylinder is larger than the force upon the movable arm 28 following the operating lever 30 (FLO>FBO).

Then, when the movable arm 28 is opening, force FL1 (almost equal to FLO in magnitude) is generated in the operating shaft 34 provided at the tip of the operating lever 30 in a direction tangential to a circle around the supporting shaft 32. Force FB1 acts upon the tip of the movable arm 28 in a direction tangential to a circle around the hinge 26. At this point of time, directions of both the forces differ from each other, and that component force (FL1'=FL1×sin $_p$) of the force FL1, which acts in the same direction as that of the force FB1, is used as a force opening the movable arm 28. This component force FL1' decreases as the movable arm 28 opens. On the other hand, the force FB1 becomes so large due to the input from and the inertia force of the operating lever 30. Therefore, repulsion force almost equal to difference (FB1−FL1') between the forces FB1 and FL1' acts around the operating shaft 34.

Thus, the impact-absorbing plate 53 and the cord member 54 are started to exhibit the speed-reducing function and the impact-mitigating function before the above repulsion exceeds durability around the operating shaft 34 and causes breakage. For example, referring to FIG. 13, the impact-absorbing plate 53 is made to be deformed at a given point of time "b" prior to that "a" where the movable arm is completely opened along a dotted line "f" which is an extension line of an initial acceleration line when no impact-absorbing plate 53 is used. Thus, the impact-absorbing plate 53 begins to exhibit the speed-reducing function from the point of time "b", so that the gratitude of the line in the graph becomes smaller as shown by a solid line "g" to retard, to a point of time "c", the point of time when the movable arm is completely opened (The speed of the movable arm 28 when the movable arm is opening to the "completely opened state" is retarded). Thereby, the impact generating in the operating shaft 34 can be mitigated. In this case, the timing is set to be not retarded to a point of time "d" which is a limit from the standpoint of view of performance.

After the knee-receiving member is shifted in this way, the knees of the driver or the front-seat passenger having the average physique or relatively large physique will butt an upper portion of the knee-receiving member, whereas the knees of the driver or the front-seat passenger having the smaller physique will butt a lower portion of the knee-receiving member. Since the lower portion of the knee-receiving member 3 is turned at this time, it can receive the knees of the driver or the front-seat passenger having the smaller at an earlier point of time.

Thereafter, the impact-absorbing section 6 functions in such a manner that the upper impact-absorbing portion 11 is deformed to absorb the driver or the front-seat passenger having the average, physique or the relatively large physique, whereas the lower impact-absorbing portion 12 is deformed to absorb the driver or the front-seat passenger having the relatively small physique.

In this way, the upper impact-absorbing portion 11 and the lower impact-absorbing portion 12 are separately set corresponding to the upper and lower portions of the impact-receiving member, respectively, and difference in strength is so set between the upper impact-absorbing portion and the lower impact-absorbing portion that the receiving strength of the former is greater than that of the latter. The upper impact-absorbing portion 11 appropriately absorbs the input energy of the knees of the driver or the front-seat passenger having the average physique or the relatively large physique, whereas the lower impact-absorbing portion 12 appropriately absorbs the driver or the front-seat passenger having the relatively small physique. Thus, according to the present invention, the knee bolster structure can exhibit different receiving strengths to cope with persons having different physiques. Consequently, the knee bolster structure according to the present invention can be afforded with the function to appropriately cope with various persons having different physiques.

In addition, according to this embodiment, the impact-absorbing section 6 and the knee-receiving member movement section 7 are structurally separated to have their respective functions, and can be combined together. Therefore, when plural kinds of the impact-absorbing sections and plural kinds of the knee-receiving member movement sections 7 are preliminarily prepared, desired knee bolster structures can be constructed for various kinds of vehicles such as automobiles by appropriately combining the impact-absorbing sections and the knee-receiving member movement sections 7. Further, with respect to automobiles having similar standards such as shapes and qualities of the instrument panes 1 and their surrounding, when a common part is used for either one of the impact-absorbing section 6 and the knee-receiving member movement section 7 and readily modified parts having dimensions slightly changed are used for the other, the common part can be used and appropriate knee bolster structures can be easily constructed to cope with various vehicles. Therefore, reduction in costs and developing time periods can be realized.

In the above, the second preferred embodiment of the present invention has been explained in detail based on the attached FIGS. 7 to 13, which is merely an example of the present invention. Thus, the invention is not limited to the construction of this embodiment only, and as a matter of course any modifications, various and changes made in design with the purview of the invention are encompassed by the present invention unless they depart from the gist of the invention.

What is claimed is:

1. A knee bolster structure, comprising:
   a vehicle-side member;
   a knee-receiving member;
   an impact-absorbing section which deforms to absorb an input energy from knees of a driver or a front-seat passenger when the knees hit the knee-receiving member; and
   a knee-receiving member movement section for moving the knee-receiving member to a knee-receiving position for the driver or the front-seat passenger,
   wherein said knee-receiving member is attached to the vehicle-side member via the impact-absorbing section and the knee-receiving member movement section,
   wherein the impact-absorbing section is structurally separated from the knee-receiving member movement section, and
   wherein the impact-absorbing section is vertically divided into two sections: an upper impact-receiving portion configured to absorb the input energy from the knees of the driver or the front-seat passenger having an average physique or a relatively large physique; and a lower impact-receiving portion configured to absorb the input energy from the knees of the driver or the front-seat passenger having a relatively small physique.

2. The knee bolster structure set forth in claim 1, wherein the knee-receiving member movement section comprises a fixed arm and a movable arm which are connected together with a hinge at upper end portions thereof such that the movable arm is opened from the fixed arm via the hinge, and an operating lever for opening the movable arm relative to the fixed arm, wherein the operating lever is connected to the movable arm via a slide fitting between an elongate hole and an operating shaft for the operating lever and the movable arm.

3. The knee bolster structure set forth in claim 2, further comprising an impact-mitigating mechanism provided to mitigate an impact force generated at the operating shaft.

4. The knee bolster structure set forth in claim 3, wherein the impact-mitigating mechanism comprises a stopper, provided at the fixed arm, upon which the operation lever hits before the operating shaft reaches an open-side end of the elongate hole.

5. The knee bolster structure set forth in claim 3, wherein the impact-mitigating mechanism comprises a decelerating portion provided at an open-side end of the elongate hole to reduce speed of the operating shaft.

6. The knee bolster structure set forth in claim 3, wherein the impact-mitigating mechanism comprises an impact-absorbing plate deformably provided at the movable arm and a cord-like member connecting the impact-absorbing plate with the fixed arm so that the cord-like member generates tension between the impact-absorbing plate and the fixed arm as the movable arm opens from the fixed arm.

7. The knee bolster structure set forth in claim 2, further comprising a holding mechanism provided to maintain the movable arm relative to the fixed arm in an opened state.

8. The knee bolster structure set forth in claim 7, wherein the movable arm has a sectional shape so slightly larger than that of the fixed arm that the movable arm is fitted around an outer periphery of the fixed arm, and the holding mechanism is provided at the movable arm.

9. The knee bolster structure set forth in claim 1, wherein strength is made different between the upper impact-absorbing portion and the lower impact-absorbing portion by increasing the strength of the upper impact-absorbing portion and decreasing the strength of the lower impact-receiving portion, by at least one of:
   relatively shortening the whole dimension of the upper impact-absorbing portion and relatively prolonging that of the lower impact-absorbing portion;
   making the length of the upper impact-absorbing portion different from that of the lower impact-absorbing portion;
   making the thickness of the upper impact-absorbing portion larger than that of the lower impact-absorbing portion;
   making the sectional shape of the upper impact-absorbing portion larger than that of the lower impact-absorbing portion; and
   providing a bendable portion or bendable portions for each of the upper impact-absorbing portion and the lower impact-absorbing portion, and making the numbers of the bendable portions different between the upper and lower impact-absorbing portions.

10. The knee bolster structure set forth in claim 1, wherein the knee-receiving member movement section further comprises an explosion type cylinder-based actuator.

11. A knee bolster structure, comprising:
   a vehicle-side member;
   a knee-receiving member;
   an impact-absorbing section for absorbing an input energy from knees of a driver or a front-seat passenger when the knees hit the knee-receiving member; and
   a knee-receiving member movement section for moving the knee-receiving member to a knee-receiving position for the driver or the front-seat passenger, wherein said knee-receiving member is attached to the vehicle-side member via the impact-absorbing section and the knee-receiving member movement section, and wherein the knee-receiving member movement section comprises a fixed arm and a movable arm which are connected together with a hinge at upper end portions thereof such that the movable arm is opened from the fixed arm via the hinge, and an operating mechanism for opening the movable arm relative to the fixed arm, the movable arm has a sectional shape so slightly larger than that of the fixed arm that the movable arm is externally fitted around the fixed arm, and the fixed arm has a holding mechanism provided at the movable arm.

12. A knee bolster structure, comprising:

a vehicle-side member;

a knee-receiving member;

an impact-absorbing section for absorbing an input energy from knees of a driver or a front-seat passenger when the knees hit the knee-receiving member; and a knee-receiving member movement section for moving the knee-receiving member to a knee-receiving position for the driver or the front-seat passenger, wherein said knee-receiving member is attached to the vehicle-side member via the impact-absorbing section and the knee-receiving member movement section, and wherein the knee-receiving member movement section comprises a fixed arm and a movable arm which are connected together with a hinge at upper end portions thereof such that the movable arm is opened from the fixed arm via the hinge, and an operating lever for opening the movable arm relative to the fixed arm, the operating lever is connected to the movable arm via a slide fitting between an elongate hole and an operating shaft for the operating lever and the movable arm, and the knee bolster structure further comprises an impact-mitigating mechanism for mitigating an impact force generating in the operating shaft.

13. The knee bolster structure set forth in claim 12, wherein the impact-mitigating mechanism comprises a stopper, provided at the fixed arm, upon which the operation lever hits before the operating shaft reaches an open-side end of the elongate hole.

14. The knee bolster structure set forth in claim 12, wherein the impact-mitigating mechanism comprises a decelerating portion provided at an open-side end of the elongate hole to reduce speed of the operating shaft.

15. The knee bolster structure set forth in claim 12, wherein the impact-mitigating mechanism comprises an impact-absorbing plate deformably provided at the movable arm and a cord-like member connecting the impact-absorbing plate with the fixed arm so that the cord-like member generates tension between the impact-absorbing plate and the fixed arm as the movable arm opens from the fixed arm.

16. The knee bolster structure set forth in claim 13, wherein the impact-mitigating mechanism comprises an impact-absorbing plate deformably provided at the movable arm and a cord-like member connecting the impact-absorbing plate with the fixed arm so that the cord-like member generates tension between the impact-absorbing plate and the fixed arm as the movable arm opens from the fixed arm.

17. The knee bolster structure according to claim 1, wherein the knee-receiving member movement section is configured to be freely attachable to the impact-absorbing section.

* * * * *